US007356553B2

(12) United States Patent
Lutz et al.

(10) Patent No.: US 7,356,553 B2
(45) Date of Patent: Apr. 8, 2008

(54) DATA PROCESSING APPARATUS AND METHOD FOR DETERMINING A PROCESSING PATH TO PERFORM A DATA PROCESSING OPERATION ON INPUT DATA ELEMENTS

(75) Inventors: David Raymond Lutz, Austin, TX (US); Christopher Neal Hinds, Austin, TX (US)

(73) Assignee: ARM Limited, Cambridge (GB)

( * ) Notice: Subject to any disclaimer, the term of this patent is extended or adjusted under 35 U.S.C. 154(b) by 776 days.

(21) Appl. No.: 10/803,164

(22) Filed: Mar. 18, 2004

(65) Prior Publication Data

US 2005/0210095 A1  Sep. 22, 2005

(51) Int. Cl.
*G06F 7/465* (2006.01)
(52) U.S. Cl. .................................................. 708/505
(58) Field of Classification Search ................. 708/505
See application file for complete search history.

(56) References Cited

U.S. PATENT DOCUMENTS 5,568,412 A * 10/1996 Han et al. ................... 708/497
6,085,212 A *  7/2000 Oberman .................... 708/505
6,088,715 A *  7/2000 Oberman .................... 708/505

(Continued)

OTHER PUBLICATIONS

Naini et al; "1-GHz HAL SPARC64® Dual Floating Point Unit With RAS Features"; Proceedings of the 15th IEEE Symposium on Computer Arithmetic (ARITH'01), 2001 pp. 1-11.

(Continued)

*Primary Examiner*—D. H. Malzahn
(74) *Attorney, Agent, or Firm*—Nixon & Vanderhye P.C.

(57) ABSTRACT

The present invention provides a data processing apparatus and method for performing a data processing operation on first and second floating point data elements, the first floating point data element specifying a first exponent and the second floating point data element specifying a second exponent. The data processing apparatus comprises processing logic providing multiple processing paths which are selectable to perform the data processing operation, including a first processing path operable to perform the data processing operation if a predetermined alignment condition exists. Further, at least one detector logic unit is provided which is operable to receive both the first exponent and the second exponent and to detect the presence of the predetermined alignment condition. Each detector logic unit comprises half adder logic operable to perform a half adder operation to logically subtract one of the first and second exponents from the other of the first and second exponents to produce at least a sum data value of sum and carry data values representing the result of the half adder operation. Further, each detector logic unit comprises generation logic operable to receive the sum data value and to generate a select signal which is set if the sum data value has a predetermined value indicating the existence of the predetermined alignment condition. The processing logic is then operable to select the first data processing path to perform the data processing operation if the select signal from one of the at least one detector logic units is set. The particular structure of detector logic unit provided enables a fast detection of the existence of the predetermined alignment condition, which enables an early selection of the first data processing path if the select signal is set. This enables significant power and area savings to be made.

22 Claims, 8 Drawing Sheets

U.S. PATENT DOCUMENTS

| | | | | |
|---|---|---|---|---|
| 6,094,668 | A | * | 7/2000 | Oberman .................... 708/505 |
| 6,397,239 | B2 | * | 5/2002 | Oberman et al. ........... 708/505 |
| 7,043,516 | B1 | * | 5/2006 | Wolrich et al. ............. 708/505 |
| 2003/0055859 | A1 | * | 3/2003 | Seidel et al. ................ 708/505 |

OTHER PUBLICATIONS

Lutz et al; "Early Zero Detection"; Proceeding of the 1996 International Conference on Computer Design (ICCD'96); 1996 IEEE, pp. 545-550.

* cited by examiner

DATA PROCESSING APPARATUS AND METHOD FOR DETERMINING A PROCESSING PATH TO PERFORM A DATA PROCESSING OPERATION ON INPUT DATA ELEMENTS

BACKGROUND OF THE INVENTION

1. Field of the Invention

The present invention relates to a data processing apparatus and method for determining a processing path to perform a data processing operation on input data elements.

2. Description of the Prior Art

A data processing apparatus may be arranged to perform a data processing operation on various types of data element. One type of data element which may be subjected to such data processing operations is the floating point data element. A floating point number can be expressed as follows:

$$\pm 1.x * 2^y$$

where:

x=fraction 1.x=significand (also known as the mantissa)

y=exponent

When performing a data processing operation on floating point data elements, a number of eventualities have to be catered for in the processing logic path, and accordingly extra logic needs to be included in the data processing path to perform the required processing dictated by these eventualities (for example rounding, normalization, etc). This often means that the processing path for performing the data processing operation is relatively long, which can have an impact on processing speed. As an example, in a pipelined data processing apparatus used to perform such data processing operations, a relatively large number of pipeline stages may be required to ensure that all of the necessary logic elements required to cover the various eventualities is provided.

For certain data processing operations, for example floating-point addition, it is known to provide within the processing logic different processing paths, each of which is capable of performing the data processing operation under certain conditions. As an example, for floating-point addition, it is known to provide a near processing path and a far processing path, as for example is discussed in the paper "1-GHz HAL SPARC64 Dual Floating Point Unit with RAS Features"- by A Naini et al, Proceedings of the 15th IEEE Symposium on Computer Architecture, 2001. The near path can be used if the first and second floating point data elements require at most a 1-bit alignment, whereas otherwise the far path needs to be used. When the input floating point data elements require at most a 1-bit alignment, it is possible that when performing an unlike-signed addition (i.e. equivalent to subtracting one data element from the other) massive cancellation may occur, and to enable the resultant floating point value to be correctly aligned, it is then necessary to provide normalisation logic within the near path. Such logic is not required in the far path. However, in the far path, it is necessary to provide rounding logic due to the fact that the data elements may need more than a 1-bit alignment. Such rounding logic is not required in the near path.

Accordingly, by providing a near path and a far path, the length of each path can be made shorter than would be the case if a single unitary path were provided for performing the data processing operation, and this can hence produce an increase in processing speed. For example, considering the earlier pipelined processing logic example, the pipeline depth can be reduced by using a near path and a far path, which can give rise to increase in processing speed when compared with a unitary processing path. However, one problem that arises when providing more than one processing path for performing the data processing operation is in determining whether the alignment condition required for using any particular path does in fact exist.

In accordance with the technique discussed in the above-mentioned paper from the 15th IEEE Symposium on Computer Arithmetic, prediction logic is used to predict whether the alignment condition for the near path exists, which can make an early prediction as to whether the alignment condition for the near path appears to exist. However, predicted results by their very nature will not necessarily be true, and accordingly it is necessary to perform the processing in both the near path and the far path until such time as the presence of the alignment condition can actually be determined. Hence, whilst the predicted result can be used to perform some initial processing, for example shifting, in the near path, it is not until the actual alignment condition is positively determined that the result from any particular path can be used. Hence, such an approach is not very power efficient, since the data processing operation needs to be performed in both processing paths. Further, this has some impact on the area required for the processing logic, since further logic is needed in addition to the prediction logic to perform the actual detection of the alignment condition at a later stage in the processing path, and to manage the computations being performed within several different processing paths.

A further problem is that because the prediction may be wrong, any assumptions made in an early part of the near processing path based on that prediction cannot be used in the far processing path, since if the prediction proves wrong it will be necessary to rely on the processing performed in the far processing path in order to generate the correct result. Accordingly, there is no opportunity to share logic between the near and far processing paths, which again leads to an implementation which is inefficient in terms of size of the processing logic, and in terms of power consumption.

It is an object of the present invention to provide an improved technique for determining a processing path to be used to perform a data processing operation on input data elements.

SUMMARY OF THE INVENTION

Viewed from a first aspect, the present invention provides a data processing apparatus for performing a data processing operation on first and second floating point data elements, the first floating point data element specifying a first exponent and the second floating point data element specifying a second exponent, the data processing apparatus comprising: processing logic providing multiple processing paths which are selectable to perform the data processing operation, including a first processing path operable to perform the data processing operation if a predetermined alignment condition exists; at least one detector logic unit operable to receive both said first exponent and said second exponent, and to detect the presence of said predetermined alignment condition, each detector logic unit comprising: half adder logic operable to perform a number of half adder operations to logically subtract one of the first and second exponents from the other of the first and second exponents to produce at least a sum data value of sum and carry data values representing the result of the number of half adder operations; and generation logic operable to receive the sum data value and to generate a select signal which is set if the sum data value has a predetermined value indicating the existence of said predetermined alignment condition; the processing logic being operable to select the first data processing path to perform the data processing operation if the select signal from one of said at least one detector logic units is set.

In accordance with the present invention, a detector logic unit is provided which can detect the presence of the predetermined alignment condition required for using a first processing path, and which can be used instead of the prediction logic used in the prior art. The detector logic unit of the present invention employs half adder logic to perform a number of half adder operations to logically subtract one of the first and second exponents from the other of the first and second exponents. A half adder operation typically produces a carry data value and a sum data value. In particular, if it is assumed that the first and second floating point data elements are X and Y where $X=x_{n-1} \ldots x_1 x_0$, and $Y=y_{n-1} \ldots y_1 y_0$ are n-bit words with low order bits $x_0$ and $y_0$, an n-bit half adder produces a carry word $C=c_{n-1} \ldots c_1 0$ and a sum word $S=s_{n-1} \ldots s_1 s_0$ such that $$\text{carry } c_i = x_{i-1} \text{ AND } y_{i-1} \quad (1)$$

$$\text{sum } s_i = x_i \text{ XOR } y_i \quad (2)$$

By adding C and S together, it will be possible to determine whether the predetermined alignment condition exists, but in practice there would be insufficient time to perform that addition early enough to enable the output to be used at an early stage to select the required processing path to perform the data processing operation. Only if the detection of the alignment condition can be determined at an early stage can significant savings in power and area be achieved relative to the earlier described prior art techniques.

The inventors of the present invention realised that the properties of the half-adder form (C,S) dictated by the above equations (1) and (2) mean that it is possible, once a number of half adder operations have been performed, to determine the presence of the predetermined alignment condition from the sum data value alone. Accordingly, the detector logic unit of the present invention arranges the half adder logic to produce at least a sum data value of the sum and carry data values representing the result of the number of half adder operations, and generation logic is then provided to receive the sum data value and to generate a select signal which is set if the sum data value has a predetermined value indicating the existence of the predetermined alignment condition. This means that there is no requirement to add together the carry data value C and the sum data value S, and this enables the existence of the predetermined alignment condition to be detected significantly more quickly than was previously thought possible.

Accordingly, through use of the present invention it is possible for the processing logic to be operable to select the first data processing path to perform the data processing operation if the select signal from one of the at least one detector logic units is set. Because of the speed with which the detector logic unit of the present invention detects the presence of the predetermined alignment condition, this selection can be performed at an early stage in the processing path, and hence allow significant savings to be made in terms of both power and area.

The number of half adder operations performed by the half adder logic will vary dependent on the predetermined alignment condition to be detected. However, in one embodiment, the number of half adder operations performed by the half adder logic is a plurality of half adder operations.

In one embodiment, if the select signal from one of said at least one detector logic units is set, the processing logic is operable to prevent performance of the data processing operation in the processing paths other than the first processing path. This is possible due to the fact that the detector logic unit is able to detect the presence of the predetermined alignment condition significantly more quickly than known detectors, and in particular early enough to enable the processing paths other than the first processing path to be turned off to conserve power. It will be appreciated that there are a number of ways to prevent performance of the data processing operation in the processing paths other than the first processing path. In one particular embodiment, this is done by routing the select signal to logic which generates enable signals for the various components in the processing paths, with this logic then being arranged to disable the logic elements in the processing paths other than the first processing path upon receipt of a set select signal.

It will be appreciated that the predetermined alignment condition may take a variety of forms dependent on, for example, the data processing operation being performed. However, in one embodiment, the predetermined alignment condition specifies that the first and second floating point data elements require at most a one-bit alignment, and the at least one detector logic unit is operable to detect whether the first and second exponents differ by one by determining whether the sum value has a value of −2, if the sum value has a value of −2 the at least one detector logic unit being operable to generate a shift signal in addition to the select signal. If the first and second exponents differ by one, then it is appropriate to shift the mantissa of one of the data elements so that they are aligned prior to performing the data processing operation. Accordingly, this shift signal can be routed to the logic within the first processing path used to perform such a shift.

In such an embodiment, it will be appreciated that the select signal will be set if the first and second exponents differ by one. However, in addition, the select signal should still be set if the first and second floating point data elements are actually aligned. A separate zero-alignment detector can be used to make that detection, with the select signal then being produced if either the zero-alignment detector detects a zero-alignment, or the at least one detector logic unit detects a sum value of −2 (i.e. detects that the first and second exponents differ by one).

However, in one embodiment of the present invention the at least one detector logic unit is operable to detect whether the first and second exponents are equal or differ by one by determining whether the sum value has a value of −1 or −2, if the sum value has a value of −1 or −2 the at least one detector logic unit being operable to generate the select signal. Accordingly, in such an embodiment, the at least one detector logic unit detects when the first and second exponents differ by one and also detects if a first and second exponents are equal, if they are equal this being indicated by the sum value having a value of −1.

It will be appreciated that the half adder logic within each of the at least one detector logic units can take a variety of forms. However, in one embodiment, both the first and second exponents have n bits, and the half adder logic comprises: first n-bit half adder logic operable to perform a first half adder operation to logically subtract said one exponent from said other exponent to produce an intermediate sum value and an intermediate carry value; and additional logic operable to perform at least a partial second half adder operation to logically add the intermediate sum value and intermediate carry value to generate said sum value. It is possible for second n-bit half adder logic to be used instead of the additional logic referenced above, but since the generation logic only needs to use the sum data value in order to determine whether to generate a select signal, then the additional logic can be used instead of a second n-bit half adder logic to provide a more efficient implementation of the half adder logic.

It will be appreciated that the additional logic may be constructed in a variety of ways. However in one embodiment, the additional logic comprises XOR logic operable to perform an XOR operation on corresponding bits of the intermediate sum value and the intermediate carry value other than the least significant bit.

The processing logic may take a variety for forms. However, in one embodiment the processing logic has a plurality of pipeline stages, and each processing path comprises multiple pipeline stages, the at least one detector logic unit being operable to generate the shift signal for input to a first pipeline stage of the first processing path, this first pipeline stage containing shift logic, and the shift signal being used to control the operation of the shift logic. Hence, the at least one detector logic is able to generate the shift signal in time for it to be input to a first pipeline stage of the first processing path, thus enabling any necessary shift of one of the data elements to take place prior to performing the data processing operation. Further, since this shift signal is based on an actual detection of the presence of the predetermined alignment condition, rather than merely a prediction of it, this means that the shift is guaranteed to be correct, and accordingly no further logic is required later in the processing paths to account for a situation in which an incorrect shift is made (as would be the case if the shift was based on a prediction).

In one particular embodiment, the first floating point data element specifies a first mantissa and the second floating point data element specifies a second mantissa, and the shift logic comprises first shift logic provided to selectively perform a shift operation on the first mantissa and second shift logic provided to selectively perform a shift operation on the second mantissa, the at least one detector logic unit comprising a first detector logic unit associated with the first shift logic and a second detector logic unit associated with the second shift logic, the half adder logic of the first detector logic unit being operable to logically subtract the first exponent from the second exponent and the half adder logic of the second detector logic unit being operable to logically subtract the second exponent from the first exponent.

It will be appreciated that the multiple processing paths may incorporate entirely separate logic. However, since the shifting performed within the first pipeline stage of the first processing path is based on an exact determination of the presence of the predetermined alignment condition (rather than just a prediction), it can be guaranteed that any shift performed is appropriate, and accordingly in one embodiment the first pipeline stage is common to the multiple processing paths. This enables a reduction in area of the processing logic and can also give rise to a reduction in power consumption.

It will be appreciated that the data processing operation can take a variety of forms. However, in one embodiment the data processing operation is an unlike-signed addition operation. The first processing path can be arranged to allow such an unlike-signed addition operation to be performed in a particularly efficient manner in situations where the predetermined alignment condition is determined to exist.

Viewed from a second aspect, the present invention provides a method of determining a processing path of a data processing apparatus to perform a data processing operation on first and second floating point data elements, the first floating point data element specifying a first exponent and the second floating point data element specifying a second exponent, the data processing apparatus having processing logic providing multiple processing paths which are selectable to perform the data processing operation, including a first processing path operable to perform the data processing operation if a predetermined alignment condition exists, the method comprising the steps of: (a) providing at least one detector logic unit which receive both said first exponent and said second exponent, and within each detector logic unit detecting the presence of said predetermined alignment condition by performing the steps of: (a)(i) employing half adder logic to perform a number of half adder operations to logically subtract one of the first and second exponents from the other of the first and second exponents to produce at least a sum data value of sum and carry data values representing the result of the number of half adder operations; and (a)(ii) generating a select signal which is set if the sum data value has a predetermined value indicating the existence of said predetermined alignment condition; (b) selecting the first data processing path to perform the data processing operation if the select signal from one of said at least one detector logic units is set.

BRIEF DESCRIPTION OF THE DRAWINGS

The present invention will be described further, by way of example only, with reference to preferred embodiments thereof as illustrated in the accompanying drawings, in which.

DESCRIPTION OF PREFERRED EMBODIMENTS

A data processing apparatus may be arranged to perform a data processing operation on various types of data element.

One type of data element which may be subjected to such data processing operations is the floating point data element. A floating point number can be expressed as follows:

$$\pm 1.x * 2^y$$

where:

x=fraction 1.x=significand (also known as the mantissa)

y=exponent

A data processing apparatus arranged to perform certain data processing operations on first and second floating point data elements may provide both a near processing path and a far processing path for performing the data processing operation. In one embodiment, the near processing path can be used to perform unlike-signed addition operations on the first and second floating point data elements. Further, the near path can be used if the first and second point floating data elements require at most a 1-bit alignment, whereas otherwise the far path needs to be used. When the input floating point data elements require at most a 1-bit alignment, it is possible that when performing an unlike-signed addition (i.e. equivalent to subtracting one data element from the other) massive cancellation may occur, and to enable the resultant floating point value to be correctly aligned, it is then necessary to provide normalisation logic within the near path. Such logic is not required in the far path. However, in the far path it is necessary to provide rounding logic due to the fact that the data elements may need more than a 1-bit alignment. Such rounding logic is not required in the near path.

Figure 1:
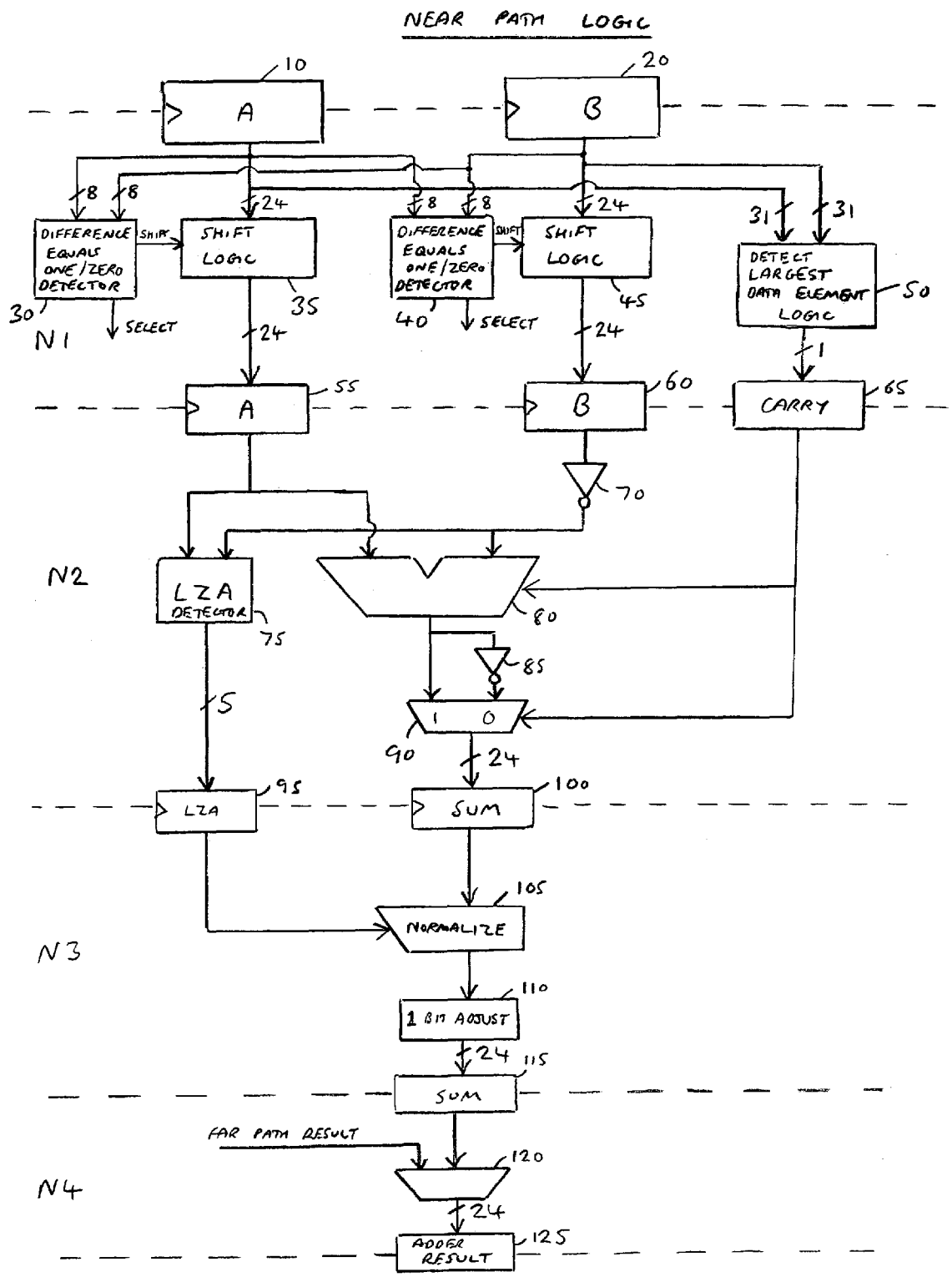
FIG. 1 is a block diagram illustrating logic provided within a near processing path of a data processing apparatus providing a near path and a far path for performing a data processing operation on first and second floating point data elements.

FIG. 1 is a block diagram illustrating logic provided within the near processing path of a data processing system to perform the necessary processing on the significand portions of first and second floating point data elements when performing an unlike-signed addition in accordance with one embodiment. In particular, it can be seen from FIG. 1 that the illustrated near path logic is contained within four pipeline stages N1 to N4. The first floating point data element A is stored in the register 10 whilst the second floating point data element B is stored in the register 20. It will be appreciated that the floating point values A and B may be single precision floating point values or double precision floating point values. However, in the example illustrated in FIG. 1, it is assumed that both input data elements are single precision floating point values. Such single precision values are 32-bit values, with the most significant bit specifying a sign value, the next 8 bits specifying an exponent value, and the final 23 bits specifying a fraction value.

From the 23-bit fraction value, a 24-bit significand can be constructed, and the 24-bit significand of the first data element is routed to associated shift logic 35 during the first pipeline stage, whilst the corresponding 24-bit significand of the second data element B is routed to associated shift logic 45 during the first pipeline stage.

Also, during this pipeline stage, the 8-bit exponents of both data elements are routed to the two detectors 30, 40, the detector 30 being associated with shift logic 35 and the detector 40 being associated with shift logic 45. As mentioned earlier, for the near path to be used, there needs to be at most a 1-bit alignment between the first and second floating point data elements, and the presence of this alignment condition is detected by the detectors 30, 40 by a comparison of the exponents of both input data elements. As will be discussed in more detail with reference to FIG. 2, each detector 30, 40 seeks to detect this alignment condition by performing a number of half adder operations in a manner such that the detection of the alignment condition can be determined from analysis of the sum data value alone.

Figure 2:
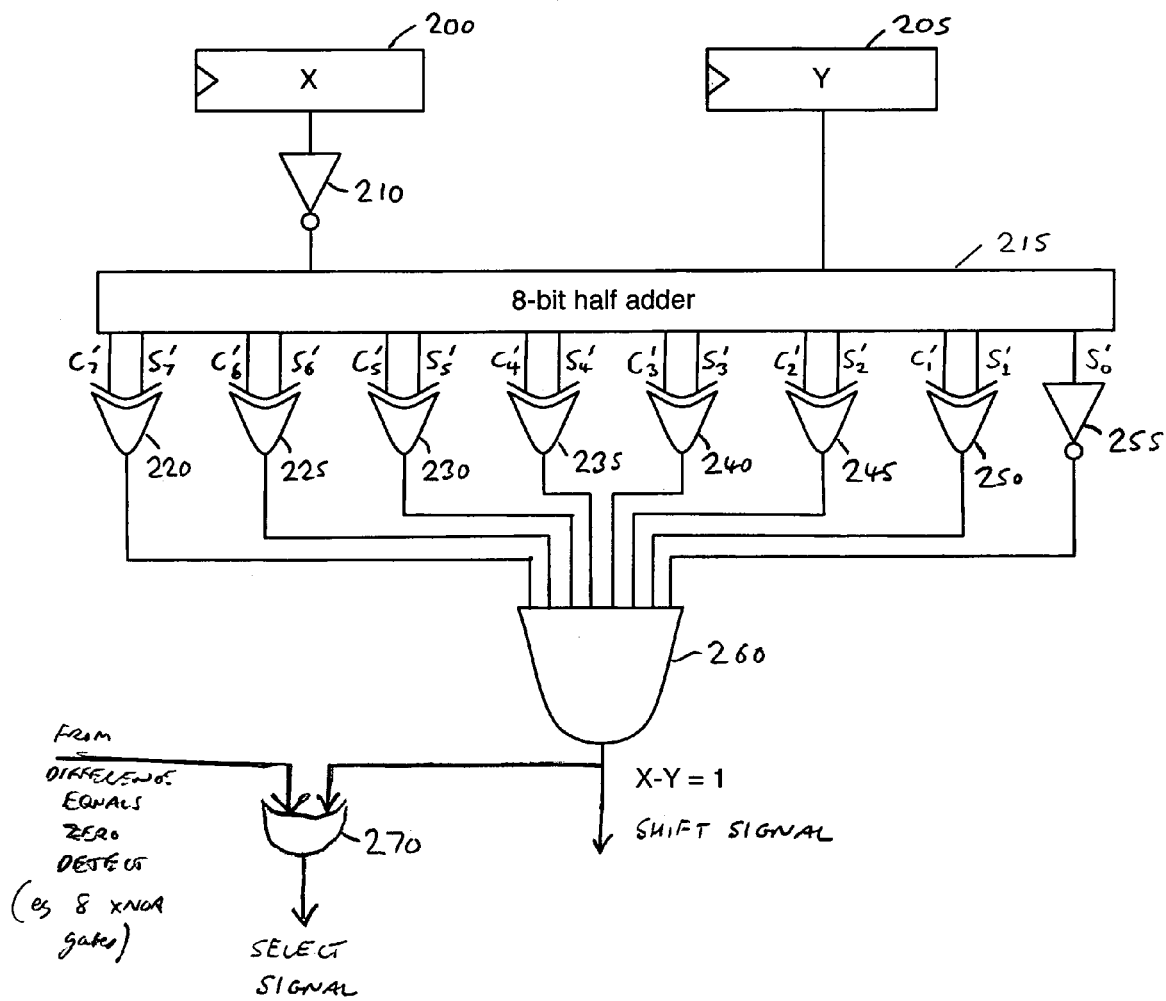
FIG. 2 is a diagram illustrating logic provided within the difference equals one/zero detector of FIG. 1.

Before discussing the logic of FIG. 2, the following background is provided concerning the operation of an n-bit half adder and the manner in which the half adder operations can be performed to enable solely the analysis of the resultant sum value to provide an indication of the presence of the alignment condition.

An n-bit half adder consists of n independent half adders. It takes two n-bit two's complement numbers as inputs, and produces two outputs: an n-bit sum and an n-bit carry. In the present context, the exponent values are unsigned values that can be treated as two's complement numbers. Let $X=x_{n-1} \ldots x_1 x_0$, and $Y=y_{n-1} \ldots y_1 y_0$ be n-bit words with low order bits $x_0$ and $y_0$. An n-bit half adder produces a carry word $C=c_{n-1} \ldots c_1 0$ and a sum word $S=s_{n-1} \ldots s_1 s_0$ such that:

$$c_i = x_{i-1} \text{ AND } y_{i-1} \quad (1)$$

$$s_i = x_i \text{ XOR } y_i \quad (2)$$

Note that $c_0$ is always 0, and that $C+S=X+Y$ (modulo $2^n$).

By definition, (C,S) is in n-bit half-adder form (also referred to as n-bit h-a form) if there exist n-bit X and Y satisfying equations 1 and 2. We write (C,S)=ha(X,Y), and the modifier "n-bit" can be omitted unless it is necessary for clarity.

Theorem 1 Let (C,S) be a number in h-a form. Then it can be proved that the situation where S=−1 means that C+S=−1.

Proof

[⇒] (C,S) is in h-a form, so there exist X and Y such that X+Y=−1 and (C,S)=ha(X,Y). By the definition of a two's complement number, X+Y=−1 means that Y=$\overline{X}$. Then by equation 2, S=X XOR $\overline{X}$=−1.

[⇐] By the definition of h-a from (see equations (1) and (2) above), only one of $c_i$ and $s_{i-1}$ can be set for i=1, ..., n−1, so C=0, and C+S=−1.

The above Theorem 1 was discussed in the paper "Early Zero Detection" by D Lutz et al, Proceedings of the 1996 International Conference on Computer Design, pages 545 to 550. However, it was only discussed in the context of integer arithmetic.

By the above Theorem 1, it can be seen that if it is desired to determine whether two numbers are equal, then a half adder operation can be performed using the two numbers as inputs, and if the sum value has a value of −1, this will indicate that the carry value is zero, and that the two numbers are hence equal. However, in the current context of the detectors 30, 40 in FIG. 1, a key requirement is to detect whether the two input exponents differ by one. In other words, if the two exponents are considered to be X and Y, then the detector logic 30, 40 needs to determine whether X−Y=1 or Y−X=1. The following discussion will illustrate why, through the use of two half adder operations (or their equivalent), such an alignment condition can still be detected merely by reviewing the value of the sum data value produced.

Lemma 1 Given two n-bit numbers X and Y, then it can be shown that the equation X−Y=1 is equivalent to the equation Y+$\overline{X}$=−2.

Proof:

$$X - Y = 1 \Leftrightarrow Y - X = -1$$

$$\Leftrightarrow Y + \overline{X} + 1 = -1 \text{(by definition of two's complement numbers)}.$$

$$\Leftrightarrow Y + \overline{X} = -2$$

The earlier theorem 1 provides an easy test for comparing sums with −1, but we need a test for comparing sums with −2.

Theorem 2 Let (C,S) be a number in h-a form, and suppose $c_1=0$. Then it can be proved that the situation where S=−2 means that C+S=−2.

Proof: [⇒]Recall that −2 is represented in two's complement numbers as a word consisting of all ones except for a zero in the low order bit. $c_1=c_0=0$, so we cannot have C+S=−2 unless $s_1=1$ and $s_0=0$. Now $s_1=1 \Rightarrow c_2=0$. Again, we cannot have C+S=−2 unless $S_2=1$. A simple induction completes this half of the proof.

[⇐]S=−2⇒$s_i=1$ for i=1,2, . . . ,n−1. By the definition of h-a form, only one of $c_i$ and $s_{i-1}$ can be set for i=1, . . . , n−1, so $c_i=0$ for i=2,3, . . . ,n−1. By assumption, $c_1=c_0=0$. Therefore, C=0, and C+S=−2.

The critical step in the proof above relies on the fact that the AND and XOR of two bits cannot both be true.

Note that $c_1=0$ can be guaranteed by using two levels of half adders.

FIG. 2 illustrates logic provided within each detector 30, 40 that uses the concepts set out in the above proof to detect a condition where the sum value equals −2, thereby indicating the presence of the required alignment condition, i.e. that the two exponents differ by one. In particular, one of the exponents X is latched in register 200 while the other exponent Y is latched in register 205. The detector 30 is used to evaluate whether subtraction of the exponent of A from the exponent of B gives a result of one, whilst the detector logic 40 is used to evaluate whether subtracting the exponent of B from the exponent of A gives a result of one. Accordingly, with reference to FIG. 2, for the detector 30, the exponent of B is placed in register 200, and the exponent of A is placed in register 205, whilst for detector logic 40, the exponent of A is placed in register 200 and the exponent of B is placed in register 205.

Figure 3:
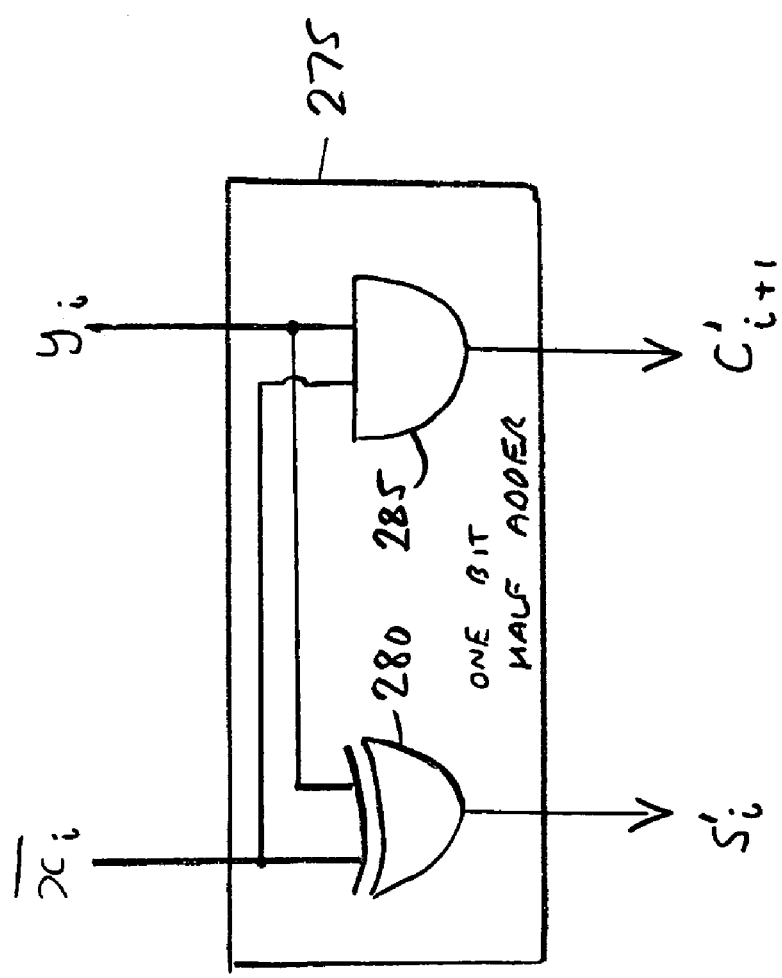
FIG. 3 is a diagram illustrating the construction of a one-bit half adder provided within the 8-bit half adder of FIG. 2.

The inverter 210 inverts the exponent value X stored in register 200 prior to input to the 8-bit half adder, and the 8-bit half adder 215 is then arranged to perform the above equations 1 and 2 on each pair of bits received from registers 200, 205. In particular, as illustrated schematically in FIG. 3, within the 8-bit half adder 215 is provided eight 1-bit half adders 275, each 1-bit half adder 275 including an exclusive OR gate 280 and an AND gate 285. Given the earlier equations 1 and 2, it can be seen that the output from AND gate 285 is the carry value $c'_{i+1}$ and the output from XOR gate 280 is the sum value $s'_i$. The apostrophe after the c and s values is intended to indicate that these carry values and sum values are intermediate carry and sum values.

Given the earlier discussed Theorem 2, a second level of half adder is required to perform a second half adder operation before the resultant sum value can be assessed to determine whether that sum value is −2. However, since in this implementation there is no interest in the resultant carry value, then the second half adder operation only needs to perform a partial half adder operation in order to generate the resultant sum data value, and accordingly instead of a second 8-bit half adder, the sequence of XOR gates 220, 225, 230, 235, 240, 245 and 250 can be used. These will implement the earlier mentioned equation 2 for i=1 to 7. Since by definition of the half adder form the bit zero of the intermediate carry value will be zero, this means by virtue of the earlier equation 2 that bit zero of the final sum value must be the same as bit zero of the intermediate sum value. As discussed earlier, if the final sum value is to be −2, this will require that all bits of the final sum value other than the least significant bit are 1, and that the least significant bit is 0. Accordingly, inverter 255 is used to invert bit zero of the intermediate sum value (equivalent to bit zero of the final sum value), as a result of which AND gate 260 will only output a logic one value if the final sum value is −2.

This output from AND gate 260 is used as a shift signal to input to the associated shift logic 35, 45. Accordingly, if a logic one shift signal is produced by the detector 30, this will cause the shift logic 35 to shift the significand of the data element A right by 1 bit, whilst if alternatively a logic one shift signal is produced by the detector 40, this will cause the shift logic 45 to shift the significand of data element B right by 1 bit position.

In addition to determining the shift signal, it is required that the detectors 30, 40 also detect whether it is appropriate to use the near processing path instead of the far processing path. This will be the case if either shift signal from the detectors 30, 40 is set, but will also be the case if in fact the exponents are equal. Accordingly, the detectors 30, 40 will typically also include logic for detecting whether the two exponents are equal, and it will be appreciated by those skilled in the art that such logic can be implemented in a variety of ways. With reference to FIG. 2, the output from such "difference equals zero" detect logic will be routed to OR gate 270 along with the shift signal output by AND gate 260, with the output of the OR gate 270 providing the select signal. Accordingly, the select signal will be set if either the shift signal is set or the output from a difference equals zero detector is set. This select signal, which is produced in pipeline stage N1, can be sent to enable logic to cause that enable logic to then disable the logic in the far processing path in the event that the select signal is set.

Hence, this early generation of a select signal enables the far processing path to be turned off at an early stage in the event that the alignment condition required for using the near path is detected, thus allowing significant power savings to be achieved. In addition, since the detectors 30, 40 detect the actual presence of the required alignment condition for using the near path, rather than merely making a prediction about the presence of that alignment condition, it can be guaranteed that any shifts performed by the shift logic 35, 45 are correct. This means that the logic in pipeline stage N1 can be shared by both the near path logic and the far path logic, providing savings in terms of area and power.

Figure 4:
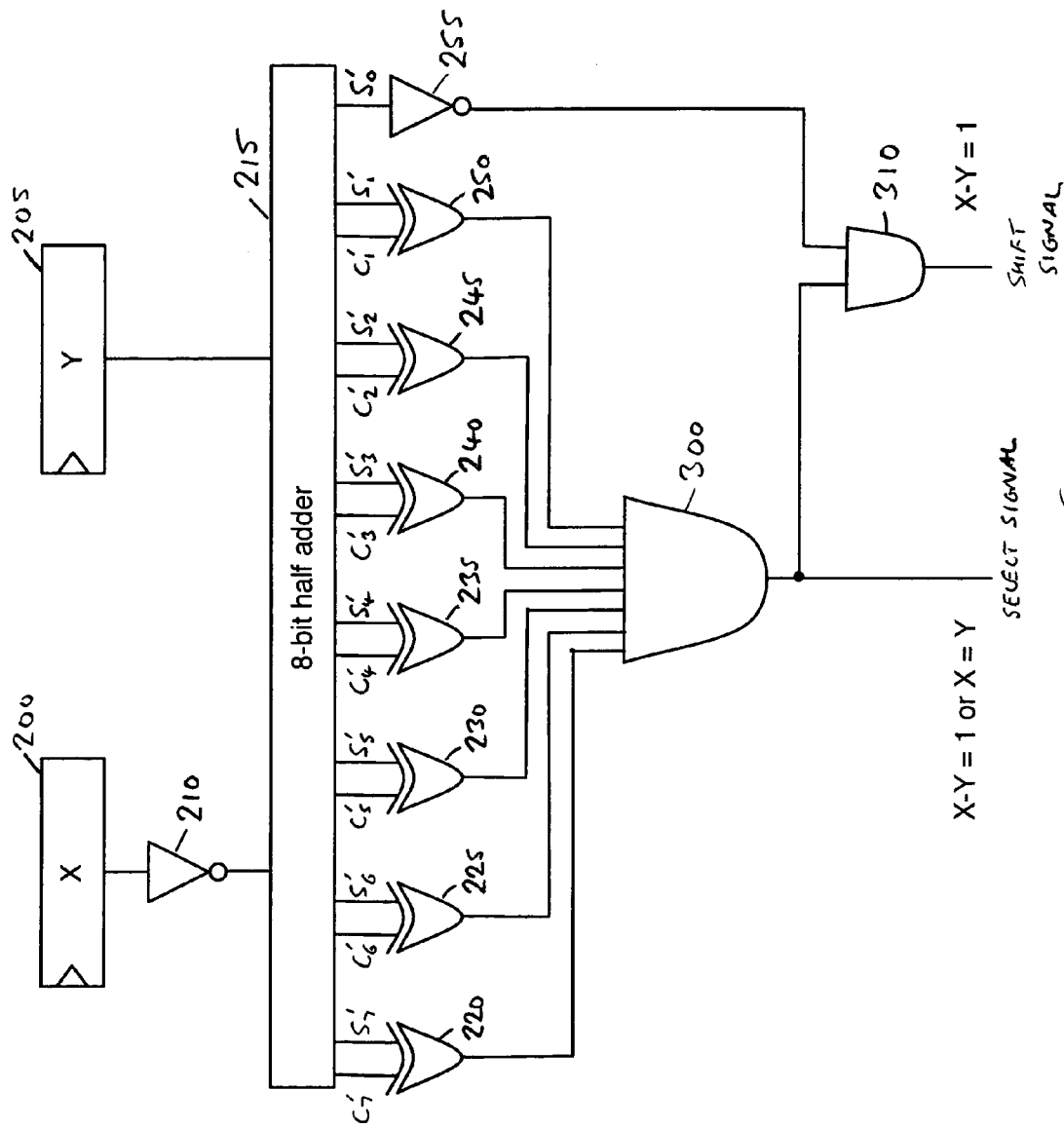
FIG. 4 illustrates an alternative embodiment of the difference equals one/zero detector of FIG. 1.

FIG. 4 is a block diagram illustrating an alternative configuration of the detector logic 30 or 40, in which the detection of both exponents being equal is performed directly by the logic that is being used to detect whether the exponents, differ by one. As can be seen by comparison of FIG. 4 with FIG. 2, the 8-bit AND gate 260 of FIG. 2 is replaced by a 7-bit input AND gate 300. Given the earlier discussions, it will be appreciated that if the exponents are equal, the sum value output by the detector logic will have a value of −1 (i.e. 11111111), whilst if the exponents differ by one the sum value will have a value of −2 (i.e. 11111110).

Accordingly, if all bits other than the least significant bits are set to a logic one value, this will directly indicate that the select signal should be set, since this will confirm that the exponents either differ by one, or are equal. The condition that the exponents differ by one can then be captured by routing the output from AND gate 300 to the input of AND gate 310, which also receives the output from inverter 255. Hence, it can be seen that the logic of FIG. 4 will produce both the shift signal and the select signal, which can then be used in the manner described earlier with reference to FIG. 2.

Figure 5:
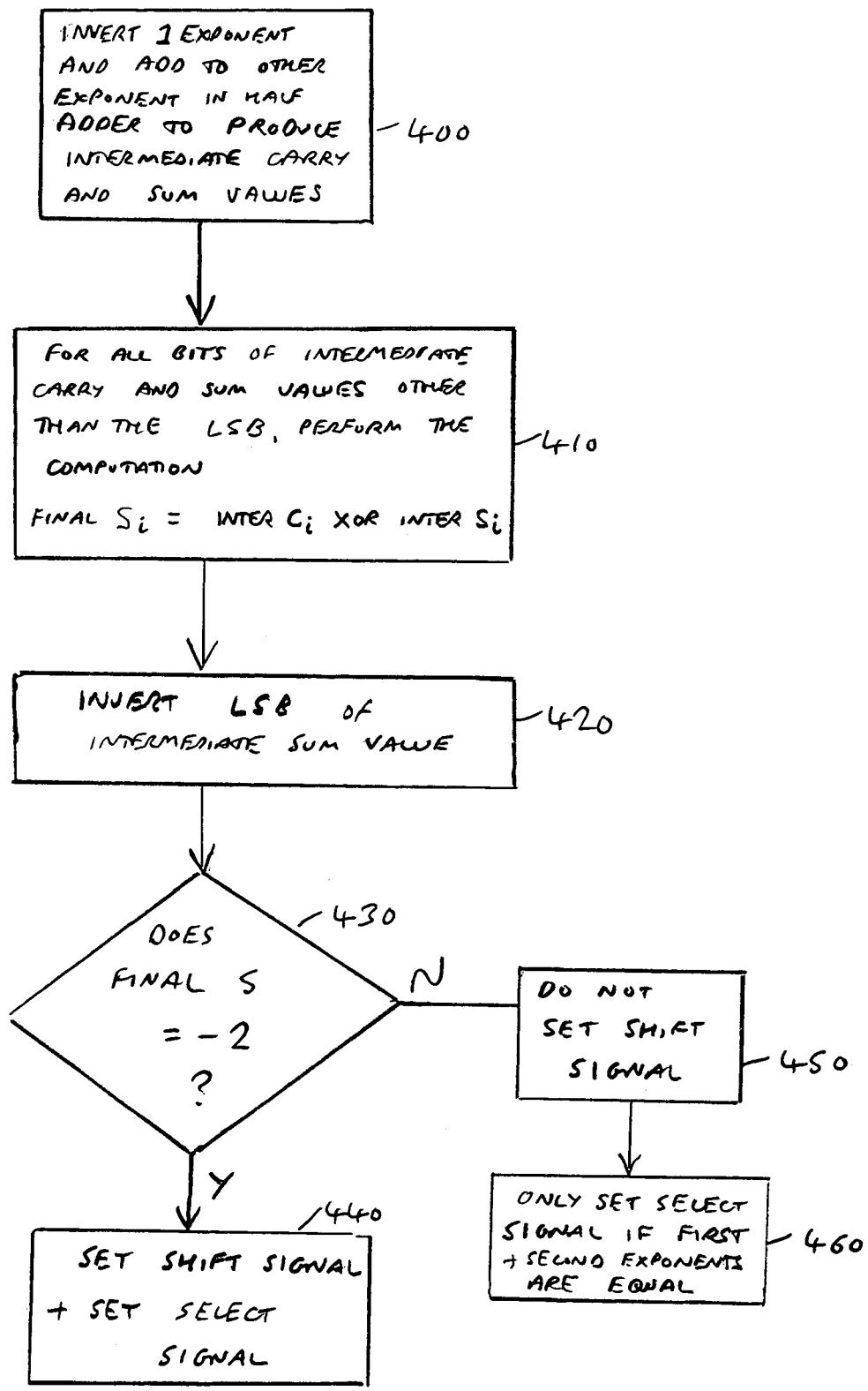
FIG. 5 is a flow diagram illustrating the processing performed within each difference equals one/zero detector of FIG. 1.

FIG. 5 is a flow diagram schematically illustrating the processing performed within each detector logic unit 30, 40. At step 400, one of the exponents is inverted and added to the other exponent in half adder logic in order to produce an intermediate carry value and an intermediate sum value. Then, at step 410, the computation $s_i = c'_i \text{XOR } s'_i$ is performed for all bits of the intermediate carry and sum values other than the least significant bit. Meanwhile, at step 420, the least significant bit of the intermediate sum value is inverted. By reference to FIGS. 2 and 4, it will be appreciated that in one embodiment steps 410 and 420 are performed in parallel.

Then, at step 430, it is determined whether the sum value produced is equal to −2, and if so the process proceeds to step 440, where the shift signal is set and the select signal is set. In FIG. 2, this occurs via the outputs from AND gate 260 and OR gate 270, whilst in FIG. 4 this occurs via the outputs from AND gates 300 and 310.

If at step 430 it is determined that the sum value does not equal −2, then the shift signal is not set at step 450. The process then proceeds to step 460, where the select signal is then only set by the detector logic unit if the first and second exponents are detected to be equal.

It will be appreciated that the process of FIG. 5 is performed independently within each detector logic unit 30, 40, with the detector logic 40 inverting the first exponent, whilst the detector 30 inverts the second exponent.

The logic of FIG. 2 or 4 provides a particularly efficient technique for allowing quick detection of a difference of one between the exponents of the two input floating point data elements. For example, with reference to the embodiment of FIG. 2, the delay for an 8-bit implementation will be the delay of two XOR gates followed by an 8-input AND function (for example logic equivalent to an 8-input AND gate). This computation can be performed in the first pipeline stage N1 to enable the shift and select signals to be generated during that first pipeline stage.

Returning to FIG. 1, it can be seen that the outputs from the shift logic 35 and the shift logic 45 are latched in the registers 55, 60, respectively, and accordingly these registers will store the 24-bit significands of the input data elements A and B, shifted one place to the right as appropriate.

Figure 7:
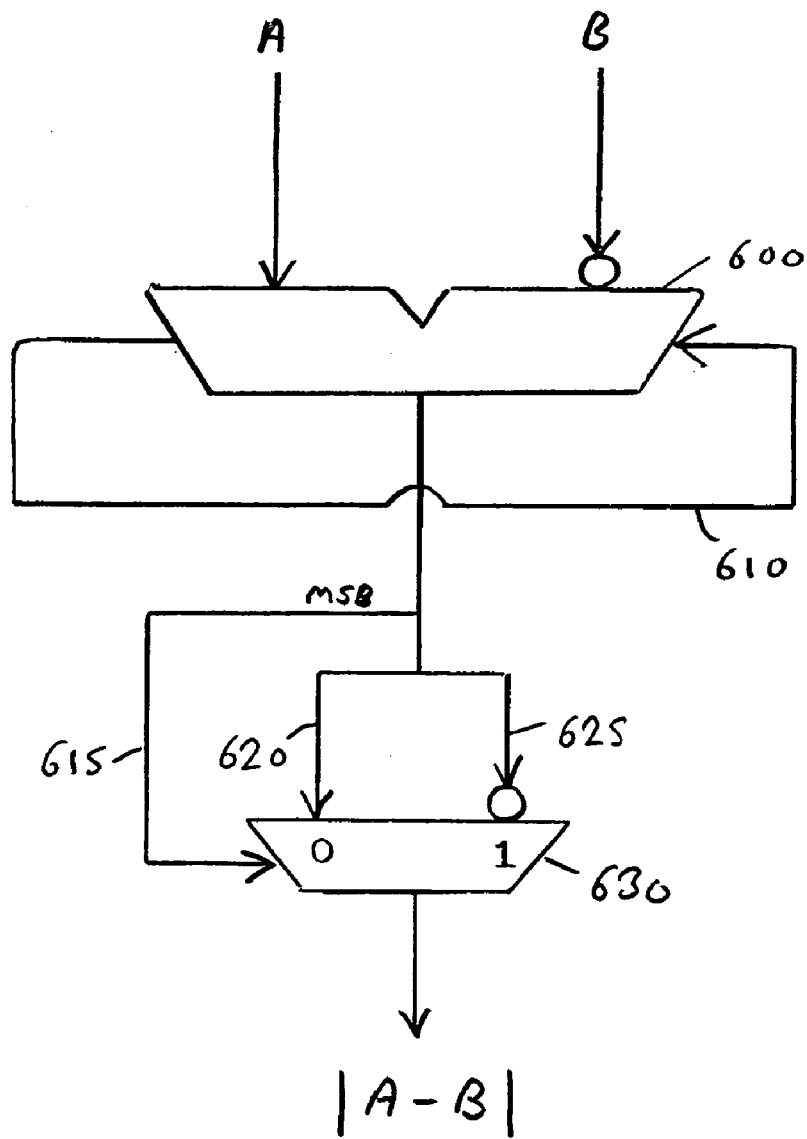
FIG. 7 is a block diagram illustrating a prior art end around carry adder.

In pipeline stage N2, it is required to determine the absolute difference between these stored significand values (the absolute difference being the magnitude of the difference between the two data elements, expressed as a positive value). One known approach for performing such an absolute difference computation is to use an end around carry adder such as that illustrated in FIG. 7. As shown in FIG. 7, the significand from data element B is inverted prior to input to the end around carry adder 600, with the significand of data element A being input without inversion. The carry out from the adder 600 is routed via path 610 as a carry in to the adder. The output from the end around carry adder is routed via path 620 to one input of the multiplexer 630, and is also routed via path 625 where it is inverted prior to input to the other input of the multiplexer 630.

If the significand of A is larger than the significand of B, then this will be indicated by a logic zero value in the most significant bit position of the output from the end around carry adder 600, and hence this most significant bit can be routed over path 615 to control the output from the multiplexer 630. Similarly, if the significand of A is less than the significand of B, then the output from the end around carry adder will be negative (as indicated by a logic one value in the most significant bit position), and negation of the result is required in order to produce the absolute difference value. This can be achieved by using the most significant bit of the output from the end around carry adder to select as the output from the multiplexer 630 the signal received at the second input of that multiplexer (i.e. an inverted version of the output from the end around carry adder).

However, such an end around carry adder is relatively slow when compared with a normal adder, and this speed problem is compounded by the fact that the selection of the output or the inverted version of the output can only be made once the most significant bit of the output from the end around carry adder is known.

As cycle times reduce, it is envisaged that there will be insufficient time in the pipeline stage N2 for the use of such an end around carry adder to compute the absolute difference.

As an alternative to using such an end around carry adder, an approach can be used where a determination is made as to which of the first and second data elements is the larger, with the ordering of the significand values then being swapped if required prior to input to a normal adder. This approach can ensure that when the normal adder is used to subtract one significand from the other, the significand of the smaller data element is the one that is subtracted from the other significand, thereby ensuring that the output from the adder is a positive value. However, as cycle times decrease, it is envisaged that there will be insufficient time in pipeline stage N2 to allow such swapping of the significand values to take place prior to input to the adder.

In accordance with the embodiment illustrated in FIG. 1, absolute difference logic is provided in pipeline stage 2 consisting of the inverter 70, the adder 80, the inverter 85 and the multiplexer 90. The adder 80 and the multiplexer 90 receive a signal stored in the carry register 65, this signal being generated by logic 50 provided in pipeline stage N1. In the example illustrated in FIG. 1, this logic 50 is arranged to receive the exponent and fraction portions from both input data elements A and B, and to detect which of the data elements is the largest. It will be appreciated by those skilled in the art that the logic 50 can be arranged in a variety of ways. However, in one embodiment, the logic 50 is arranged to perform a non-redundant subtract operation on its two input values, with a comparison result being output for storage in the carry register 65 which comprises a carry out result of the non-redundant subtract operation. In particular, the comparison result is set to a logic one value if the data element A is larger than or equal to the data element B, and is set to a logic zero value if the data element B is larger than the data element A.

Before discussing the operation of the absolute difference logic employed in pipeline stage N2, the following discussion is provided to indicate why the value of the carry signal stored in the carry register 65 can be arranged to ensure that the absolute difference logic produces a positive result without the need to provide logic for selectively swapping the ordering of the significand values before they are input to the absolute difference logic.

A two's complement adder produces a difference by inverting the minuend, and then adding it to the subtrahend with a carry-in of one. This works because for two's complement numbers, $A-B=A+\overline{B}+1$. In the present context, the significand values are unsigned values that can be treated as two's complement numbers.

The technique of the present embodiment is to manipulate the carry-in to the adder based on the magnitude comparison done in the preceding cycle by logic 50. Suppose that $A \geq B$. In this case, A−B is positive, so we set the carry-in to one and compute $A+\overline{B}+1$.

Now suppose A<B. In this case, A−B is negative, and in order to easily compute the absolute value, we set carry-in to zero and compute $A+\overline{B}$, and then invert the sum to get |A−B|.

The reason this works is that, for two's complement numbers, $-X=\overline{X}+1$, and so $\overline{X}=-X-1$, which means that $X=\overline{\overline{X}}=\overline{-X-1}$. This means that if we compute −X−1, then we can get X with a simple inversion. With respect to our original problem, −X=A−B, and $-X-1=A-B-1=A+\overline{B}$.

Accordingly, returning to FIG. 1, it can be seen that the output from register 60 is inverted by inverter 70 and then provided as one of the inputs to the adder 80. The other input of the adder logic 80 is the significand value stored in the register 55. If the carry value in register 65 is set to one, indicating that data element A is larger than data element B, then a carry-in of one will be fed to the adder 80, and the output from the adder 80 will correctly identify the absolute difference value. Accordingly, the same logic one value from the carry register 65 can be used to cause the multiplexer 90 to output the output from the adder 80 directly for storage in the sum register 100. However, if the value in the carry register 65 is a logic zero value, then the adder 80 will receive a logic zero value as a carry-in, and the output from the adder 80 will need to be inverted in order to produce the absolute difference value. This is achieved by using the carry value from the carry register 65 to drive the multiplexer 90, which in this scenario will cause the multiplexer to output to the sum register 100 the inverted input received via inverter 85.

Accordingly, it can be seen that through the use of the absolute difference logic illustrated in pipeline stage N2 of FIG. 1, the absolute difference value can be generated and stored in the sum register 100 without the need to provide any means for swapping the ordering of the inputs to the adder 80. This provides a significant performance improvement, which ensures that the absolute difference can be calculated in a single pipeline stage N2.

As mentioned earlier, when the input floating point data elements require at most a 1-bit alignment, then it is possible that when performing an unlike-signed addition operation within the near path logic, massive cancellation may occur. This means that when logically subtracting one significand value from the other, the result may have a significant number of leading zeros. The presence of such leading zeros is detected by the leading zero adjust detector 75 which is arranged to receive the output from register 55 and the inverted version of the output from register 60 as produced by inverter 70. The leading zero adjust detector 75 is constructed in a standard manner, and produces a 5-bit output signal identifying the number of leading zeros predicted to exist in the sum stored in the register 100, this value being stored in the register 95. Normalisation logic 105 is then provided in pipeline stage N3 for normalising the value stored in the register 100 based on the LZA value output from register 95.

As will be appreciated by those skilled in the art, since the leading zero adjust detector 75 is an anticipator of the number of leading zeros, it is possible that the adjustment performed by the normalisation logic 105 is out by 1 bit. Hence, once the normalised result has been produced by the normalisation logic 105, the output is evaluated to check whether the most significant bit is a logic one value. If it is, then no further adjustment is required, whereas if the most significant bit is a logic zero value, then a further 1-bit adjustment is performed within the 1-bit adjustment logic 110, whereafter the result is stored in the register 115.

The result in the register 115 is the result of the unlike-signed addition operation performed by the near path logic. In pipeline stage N4, this is routed to a multiplexer 120, which is also arranged to receive the result from the far path, such that one of the results can be selected for storing in the adder result register 125 as the result of the unlike-signed addition operation.

As mentioned earlier, in preferred embodiments, if the select signal from either detector 30, 40 is set in pipeline stage N1, then this indicates that the near path should be used to perform the operation rather than the far path, and accordingly a signal derived from this select signal can be used to control the multiplexer 120.

In one embodiment of the present invention, each input operand to the data processing apparatus only includes a single floating point data element. However, in an alternative embodiment, a Single Instruction Multiple Data (SIMD) processing is performed by the data processing apparatus, in which event each input operand will comprise a plurality of floating point data elements. In such embodiments, it is envisaged that the logic of FIG. 1 will be replicated for each pair of first and second floating point data elements provided by the input operands. Accordingly, a pair of first and second floating point data elements extracted from first and second operands will be stored in the registers 10, 20, with the logic of FIG. 1 then being replicated for each pair of first and second floating point data elements.

Figure 6:
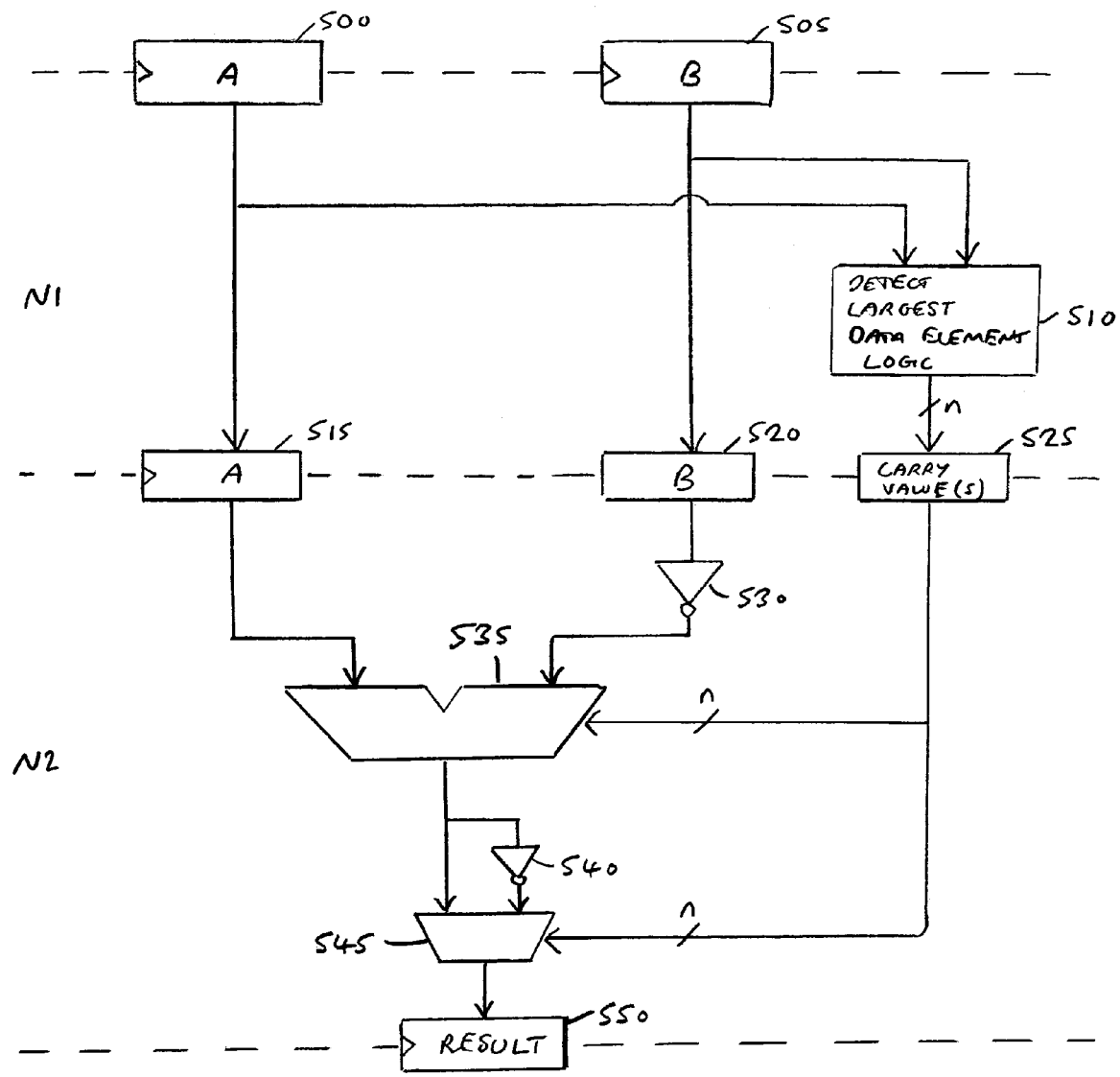
FIG. 6 is a block diagram of logic provided within a data processing apparatus to compute an absolute difference between first and second integer data elements in accordance with one embodiment.

The absolute difference logic described earlier can also be applied in a data processing apparatus used to manipulate integer data elements, as is illustrated by FIG. 6. In the example of FIG. 6, the first integer data element is stored in register 500 and the second integer data element is stored in register 505. In pipeline stage N1, the logic 510 is arranged to receive the first and second integer data elements and to determine which is the largest value, with a comparison result being output for storing in the carry value register 525 indicative of the result of that comparison. As will be discussed later, the logic 510 can actually be arranged to produce a plurality of comparison results in the event that SIMD processing is being performed, but for the time being we will assume that only a single integer data element is included within each input operand, and that accordingly the logic 510 produces a single comparison result (i.e. n=1).

The contents of the registers 500 and 505 pass directly through stage N1, where they are stored in registers 515, 520, respectively. Thereafter, the outputs of these registers 515 and 520 are routed through the absolute difference logic 530, 535, 540, 545, which operates in an identical manner to that discussed earlier with reference to the absolute difference logic 70, 80, 85, 90 of FIG. 1. This results in an absolute difference result being output from the multiplexer 545 for storing in the result register 550.

In one embodiment, it is envisaged that integer SIMD processing may be performed within the data processing apparatus, in which event a first operand will comprise a plurality of first integer data elements and a second operand will comprise a plurality of second integer data elements. In such embodiments, the entire operands are stored in the registers 500, 505, with the logic 510 being operable to receive the first and second operands and to produce, for each pair of first and second integer data elements provided by the first and second operands, an associated comparison result for storing in the carry value register 525. Accordingly, if, for the sake of example, four integer data elements are included within each input operand, a 4-bit value will be output from the logic 510 for storing in the carry value register 525. In the general sense, an n-bit value is output from the logic 510 for storing in the carry value register 525, where n is equal to the number of integer data elements contained within each input operand.

Considering now pipeline stage N2, the inverter 530 will invert the entirety of the second operand B prior to inputting that inverted version of the operand to the adder 535. For each pair of first and second integer data elements, the adder 535 will then add the associated inverted data element from the second operand to the corresponding data element from the first operand and to the associated comparison result received from the carry value register 525 in order to produce an associated intermediate result. This will result in the output from the adder 535 containing a sequence of n intermediate results, with this sequence being inverted by inverter 540 to create an inverted sequence. The multiplexer 545 is then arranged, for each pair of first and second integer data elements, to output as the associated absolute difference either the associated intermediate result or the inverted version of the associated intermediate result dependent on the associated comparison result received from the carry value register 525.

Accordingly, it can be seen that when performing integer arithmetic, a single block of absolute difference logic, and associated comparison logic 510 can be used to calculate in parallel the absolute difference for a plurality of pairs of integer data elements contained within the pair of input operands.

Figure 8:
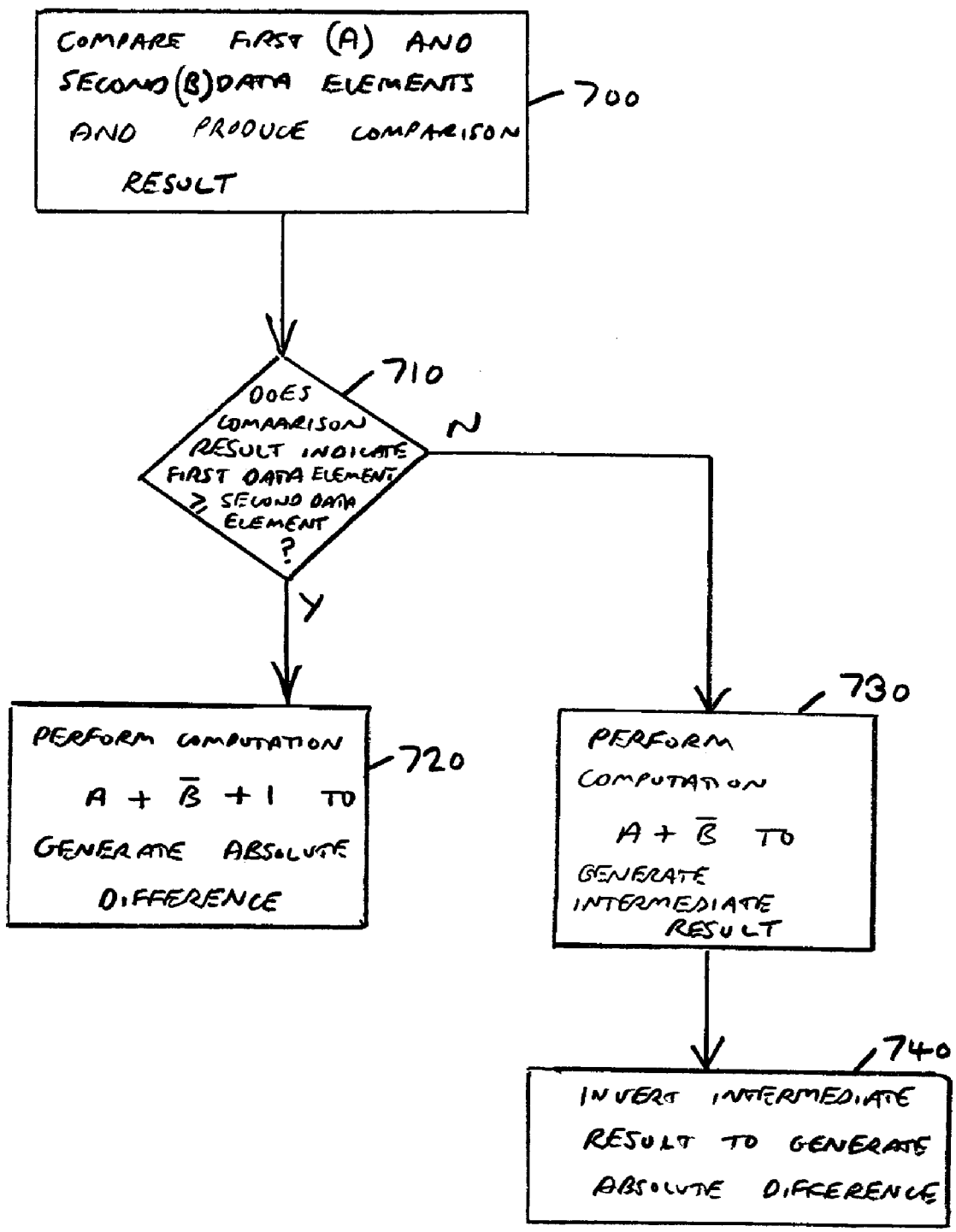
FIG. 8 is a flow diagram illustrating the processing steps performed in one embodiment to calculate an absolute difference between first and second data elements.

FIG. 8 is a block diagram illustrating the process performed when computing an absolute difference for first and second data elements when using the logic of either FIG. 1 or FIG. 6. For simplicity, FIG. 8 considers the non-SIMD approach. At step 700, the first and second data elements are compared and a comparison result is produced indicative of which data element is the larger data element. At step 710, it is then determined whether the comparison result indicates that the first data element is greater than or equal to the second data element. If this is the case, then the process proceeds to step 720, where the data element A is added to the inverted version of the data element B and added to a logic one value in order to generate the absolute difference.

However, if at step 710 it is determined that the comparison result indicates that the second data element is greater than the first data element, then process proceeds to step 730, where the data element A is added to the inverted version of the data element B to generate an intermediate result. Thereafter, at step 740, the intermediate result is inverted in order to generate the absolute difference.

By using the absolute difference logic discussed above with reference to FIGS. 1 and 6, the generation of the absolute difference can be produced in a particularly efficient manner. In particular, the critical path for the implementation of the absolute difference logic is the path involving a subtraction, inversion, and then the driving a two-input multiplexer. This provides a significantly faster implementation than the known prior art techniques.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus for performing a data processing operation on first and second floating point data elements, the first floating point data element specifying a first exponent and the second floating point data element specifying a second exponent, the data processing apparatus comprising:
   processing logic providing multiple processing paths which are selectable to perform the data processing operation, including a first processing path operable to perform the data processing operation if a predetermined alignment condition exists;
   at least one detector logic unit operable to receive both said first exponent and said second exponent, and to detect the presence of said predetermined alignment condition, each detector logic unit comprising:
   half adder logic operable to perform a number of half adder operations to logically subtract one of the first and second exponents from the other of the first and second exponents to produce at least a sum data value; and
   generation logic operable to receive the sum data value and to generate a select signal which is set if the sum data value has a predetermined value indicating the existence of said predetermined alignment condition;
   the processing logic being operable to select the first data processing path to perform the data processing operation if the select signal from one of said at least one detector logic unit is set.

2. A data processing apparatus as claimed in claim 1, wherein the number of half adder operations performed by the half adder logic is a plurality of half adder operations.

3. A data processing apparatus as claimed in claim 1, wherein if the select signal from one of said at least one detector logic unite is set, the processing logic is operable to prevent performance of the data processing operation in the processing paths other than the first processing path.

4. A data processing apparatus as claimed in claim 1, wherein the predetermined alignment condition specifies that the first and second floating point data elements require at most a one-bit alignment, and the at least one detector logic unit is operable to detect whether the first and second exponents differ by one by determining whether the sum value has a value of −2, if the sum value has a value of −2 the at least one detector logic unit being operable to generate a shift signal in addition to the select signal.

5. A data processing apparatus as claimed in claim 4, wherein the at least one detector logic unit is operable to detect whether the first and second exponents are equal or differ by one by determining whether the sum value has a value of −1 or −2, if the sum value has a value of −1 or −2 the at least one detector logic unit being operable to generate the select signal.

6. A data processing apparatus as claimed in claim 4, wherein both the first and second exponents have n bits, and the half adder logic comprises:
   first n-bit half adder logic operable to perform a first half adder operation to logically subtract said one exponent from said other exponent to produce an intermediate sum value and an intermediate carry value; and additional logic operable to perform at least a partial second half adder operation to logically add the intermediate sum value and intermediate carry value to generate said sum value.

7. A data processing apparatus as claimed in claim 6, wherein the additional logic comprises XOR logic operable to perform an XOR operation on corresponding bits of the intermediate sum value and the intermediate carry value other than the least significant bit.

8. A data processing apparatus as claimed in claim 4, wherein the processing logic has a plurality of pipeline stages, and each processing path comprises multiple pipeline stages, the at least one detector logic unit being operable to generate the shift signal for input to a first pipeline stage of the first processing path, this first pipeline stage containing shift logic, and the shift signal being used to control the operation of the shift logic.

9. A data processing apparatus as claimed in claim 8, wherein the first floating point data element specifies a first mantissa and the second floating point data element specifies a second mantissa, and the shift logic comprises first shift logic provided to selectively perform a shift operation on the first mantissa and second shift logic provided to selectively perform a shift operation on the second mantissa, the at least one detector logic unit comprising a first detector logic unit associated with the first shift logic and a second detector logic unit associated with the second shift logic, the half adder logic of the first detector logic unit being operable to logically subtract the first exponent from the second exponent and the half adder logic of the second detector logic unit being operable to logically subtract the second exponent from the first exponent.

10. A data processing apparatus as claimed in claim 8, wherein the first pipeline stage is common to the multiple processing paths.

11. A data processing apparatus as claimed in claim 1, wherein the data processing operation is an unlike-signed addition operation.

12. A method of determining a processing path of a data processing apparatus to perform a data processing operation on first and second floating point data elements, the first floating point data element specifying a first exponent and the second floating point data element specifying a second exponent, the data processing apparatus having processing logic providing multiple processing paths which are selectable to perform the data processing operation, including a first processing path operable to perform the data processing operation if a predetermined alignment condition exists, the method comprising the steps of:

(a) providing at least one detector logic unit which receive both said first exponent and said second exponent, and within each detector logic unit detecting the presence of said predetermined alignment condition by performing the steps of:

(a)(i) employing half adder logic to perform a number of half adder operations to logically subtract one of the first and second exponents from the other of the first and second exponents to produce at least a sum data value; and (a)(ii) generating a select signal which is set if the sum data value has a predetermined value indicating the existence of said predetermined alignment condition;

(b) selecting the first data processing path to perform the data processing operation if the select signal from one of said at least one detector logic unit is set.

13. A method as claimed in claim 12, wherein the number of half adder operations performed by the half adder logic is a plurality of half adder operations.

14. A method as claimed in claim 12, wherein if the select signal from one of said at least one detector logic unit is set, the method further comprises the step of preventing performance of the data processing operation in the processing paths other than the first processing path.

15. A method as claimed in claim 12, wherein the predetermined alignment condition specifies that the first and second floating point data elements require at most a one-bit alignment, and the at least one detector logic unit detects at said step (a) whether the first and second exponents differ by one by determining whether the sum value has a value of −2, if the sum value has a value of −2 the at least one detector logic unit generating a shift signal in addition to the select signal.

16. A method as claimed in claim 15, wherein the at least one detector logic unit detects at said step (a) whether the first and second exponents are equal or differ by one by determining whether the sum value has a value of −1 or −2, if the sum value has a value of −1 or −2 the at least one detector logic unit generating the select signal.

17. A method as claimed in claim 15, wherein both the first and second exponents have n bits, and said step (a)(i) comprises the steps of:

performing a first half adder operation to logically subtract said one exponent from said other exponent to produce an intermediate sum value and an intermediate carry value; and performing at least a partial second half adder operation to logically add the intermediate sum value and intermediate carry value to generate said sum value.

18. A method as claimed in claim 17, wherein the step of performing at least a partial second half adder operation comprises the step of performing an XOR operation on corresponding bits of the intermediate sum value and the intermediate carry value other than the least significant bit.

19. A method as claimed in claim 15, wherein the processing logic has a plurality of pipeline stages, and each processing path comprises multiple pipeline stages, the at least one detector logic unit generating the shift signal for input to a first pipeline stage of the first processing path, this first pipeline stage containing shift logic, and the shift signal controlling the operation of the shift logic.

20. A method as claimed in claim 19, wherein the first floating point data element specifies a first mantissa and the second floating point data element specifies a second mantissa, and the shift logic comprises first shift logic provided to selectively perform a shift operation on the first mantissa and second shift logic provided to selectively perform a shift operation on the second mantissa, the at least one detector logic unit comprising a first detector logic unit associated with the first shift logic and a second detector logic unit associated with the second shift logic, at said step (a) the half adder logic of the first detector logic unit logically subtracting the first exponent from the second exponent and the half adder logic of the second detector logic unit logically subtracting the second exponent from the first exponent.

21. A method as claimed in claim 19, wherein the first pipeline stage is common to the multiple processing paths.

22. A method as claimed in claim 12, wherein the data processing operation is an unlike-signed addition operation.

* * * * *